Patented Sept. 15, 1925.

1,553,496

UNITED STATES PATENT OFFICE.

RAYMOND F. BACON, OF NEW YORK, N. Y.

PREPARATION OF FRUIT PRODUCTS.

No Drawing.  Application filed November 8, 1924. Serial No. 748,735.

*To all whom it may concern:*

Be it known that I, RAYMOND F. BACON, a citizen of the United States, residing at New York city, in the county of New York, State of New York, have invented certain new and useful Improvements in the Preparation of Fruit Products; and I do hereby declare the following to be a full, clear, and exact description of the invention, such as will enable others skilled in the art to which it appertains to make and use the same.

This invention relates to the treatment and preparation of fruit products and has for its object the provision of certain improvements in the preparation of such products. More particularly, the invention relates to the preparation of marketable fruit products from intermediate fruit products and aims to protect the intermediate product against fermentation without impairing its flavor and quality.

In the utilization of fruits for the manufacture of fruit juices and other fruit products, it has been customary to heat the fruit after it has been selected, washed and cut up into pieces. Generally, the purpose of the heating is two-fold. First, to soften the fruit so that it may be the more easily separated into pulp and juice, and second, to extract the coloring matter. With many fruits the heating must be very carefully carried out since the heat injures or deleteriously affects the natural flavor of the fruit. In some cases the heating is dispensed with entirely, as when more forceful mechanical appliances are at hand. After the heating comes the pressing operation in which the mass is separated more or less completely into the pomace and the juice. At this point filtering operations, sometimes exacting and sometimes very crude, are resorted to for separating the juice more completely from the solid matter.

In order to preserve the juice and to hold it until it has properly ripened, clarified, etc., it is heated to a temperature and for a time sufficient to render micro-organic life inactive. One familiar with the processes of pasteurization will readily understand how the time, temperature and volume factors enter into the determination of what is the proper heating to give the juice. Another thing that determines the character of the heating is for how long and to what temperature the juice is to be heated at the time it is bottled. With different fruits, these effects vary, but in many cases a long preliminary heating prevents the product from being clear after the second heating. The heated, pasteurized juice is stored in appropriate containers, such as bottles, barrels, tanks and the like, until it is desired to bottle or use the same or until the juice is clarified. The clear juice is then drawn off by siphoning, pumping, or in any other appropriate manner. The sediment and the remaining juice are then subjected to some sort of a filtering method to separate the small amount of juice remaining from the larger amount of sediment. As a rule, the juice so separated is not clear enough to be combined with the first clear juice. Hence, it is frequently customary to heat the second juice in order to preserve it and then to store it in appropriate containers. After the second period of standing the separation process is repeated and a small portion of the clear juice that results is combined with the large amount of clear juice from the first siphoning. Ordinarily, only a relatively small amount of this second juice can be used with the first clear juice, since the flavor and color have been impaired by the heatings.

The clear juice is heated to such a temperature that further expansion in pasteurizing will not burst the bottles. It is bottled, capped, pasteurized, labeled, cased and is then ready for marketing.

The difficulty with the existing processes, hereinbefore briefly described, is that the finished fruit product has not as natural and as desirable a flavor as could be desired. The natural flavor of the fruit has been impaired, and moreover the natural fruit color is often destroyed. Preservation by heating causes undesirable changes in the fruit juice and each successive heating does more harm than its predecessor.

Fruit juices or concentrates of the same or natural flavor cannot be made by a process involving more than one heating, and in certain cases, such as the citrous fruit juices, even one pasteurization seriously impairs the flavor. To make such juices or concentrates it is necessary to employ less heating than in the processes hereinbefore described. This can be effected, in part, by using refrigeration with minimum heating prior to that refrigeration. Improved methods of filtering have also been practiced with beneficial results. And again, the time and temperature of pasteurization may be somewhat lowered where bottles and apparatus are rendered more than ordinarily free of micro-organic life.

I have discovered that by the appropriate use of certain chemical preservative agents, the amount of heating required for preserving can be very materially decreased and greatly improved fruit products can be produced. The preservatives which I make use of are readily volatile, that is to say, considerably more volatile than water. Furthermore, these preservatives are only slightly soluble in the fruit juice or other fruit product.

I have found chloroform the most satisfactory preservative for my purpose, but carbon tetrachloride, acetone and similar chemical preservatives may be used. I will throughout this specification, however, describe the invention in conjunction with the use of chloroform as the preservative, but it will be understood that the invention is not limited to chloroform but contemplates the use of other equivalent chemical preservatives.

Chloroform has a direct killing action on micro-organic life. Chloroform vapor, by excluding air in receptacles containing fruit products, prevents fermentation of the product. By a combination of these properties with heat to make lower temperatures sufficient for pasteurization and often sterilizing, I find that I can produce improved and much more desirable fruit juice. This is especially the case with citrous fruit juices, such as grape fruit, orange, lemon and others, that have not heretofore been produced with proper flavors and characteristics.

In carrying out my present invention, the fruit product is treated with a readily volatile preservative of only relatively slight solubility in the product, such for example, as chloroform. In some cases it is desirable to replace the air dissolved in the fruit juice with a non-oxidyzing gas, or otherwise remove such air. The so-treated product is then confined in a hermetically sealed receptacle under such conditions that the space not occupied by the product itself is substantially filled with the vapor of the preservative. When it is subsequently desired to use the fruit product, the receptacle is unsealed and the preservative is removed by volatilization or evaporation. The fruit product, thus freed of the preservative, is then utilized in the preparation of final marketable fruit products, or put to such other use as desired.

The fruit is selected and prepared for pressing by methods well known in the art. If the fruit is hard or if it is desired to soften and remove the color, the fruit may be slightly heated. The pressing operation is carried out in the customary manner. The juice (instead of being heated to preserve it as heretofore customary) is run into appropriate containers and a small amount of chloroform added thereto. I find it of advantage in some cases to fill the container with chloroform vapors prior to the introduction of the fruit juice. The juice may be introduced into the container in such a manner that sufficient agitation takes place to cause the chloroform vapors to take the place of air, but in some cases stirring should be resorted to in order to effect this end. Where the amounts of juice handled are large, it is often desirable to stir, then stop and stir again. Chloroform need only be added in quantities sufficient to prevent growth of microorganisms although in actual practice more is added in order to insure the preservation of the fruit product. In practice, I have secured satisfactory results by the use of 0.5% chloroform, although my usual practice has been to employ 10 cubic centimeters of chloroform per liter of fruit juice. The amount of chloroform employed will depend, to some extent, upon the initial temperature of the fruit juice, the time of its addition to the fruit juice, and the amount of stirring resorted to for volatilizing the chloroform and replacing the air by chloroform vapor.

When the space in the container not occupied by the fruit product is substantially filled with choloroform vapor, as by stirring of the fruit product with which the chloroform is associated, the containers are closed sufficiently to keep out sources of contamination and prevent loss of chloroform vapor. In other words, the containers are hermetically sealed, so to speak.

The fruit product may be kept indefinitely in the sealed containers by the aid of chloroform as hereinbefore described. The chloroform vapor, by excluding air, prevents undesirable changes in flavor while the chloroform itself exercises a direct killing action on micro-organic life. Usually the fruit product treated with chloroform as hereinbefore described is an intermediate product and is subsequently utilized in the preparation of final marketable fruit products. Various procedures may be followed in the treatment of the intermediate fruit product, preserved as hereinbefore described, and I cite the following examples as indicative of such procedures:

1. The usual processes may be followed and a better fruit product results on account of the omission of heating for initial pasteurization.

2. It is well known that agitation of materials, from which sediment is formed, aids the settling both by causing precipitation and by the larger portions of sediment dragging down finer particles with them. In my improved process this principle can be advantageously utilized. Furthermore, I can separate the clear juice from the cloudy without the aid of heat to preserve the clear juice until the yield of sediment is completed. I can transfer the fruit product, reseparate it and go through steps of filtration without the use of heat which would impair the quality of the product. The juice and sediment that remain after clear juice is drawn off can be filtered, re-handled, restored, separated (time and time again) without resorting to heating to prevent sterilization. During these various operations, in accordance with my present invention, sufficient chloroform, or other appropriate preservative is maintained in association with the fruit product to prevent fermentation. At any subsequent time the preservative can be removed from the fruit product by volatilization or evaporation without in any manner injuring the flavor or other properties of the product. This is a very important advantage in making better fruit products.

3. The chloroform may be removed from the fruit product, at the desired state of clarification, by boiling in vacuum. From this point the heretofore customary procedure may be followed, or the fruit products can then be transferred into sterile containers and sealed in them under sterile conditions. The result is a sterile product of good flavor and containing no chemical preservative.

4. Heating may be entirely done away with by bottling the juice with the chloroform in it in bottles of the proper degree of sterilization. These bottles are provided with a closing arrangement by which they may be connected in series, parallel, or singly with a source of sterile air. The air bubbling through with a low vacuum (near atmospheric pressure) in time carries off the chloroform giving a pure juice in pasteurized or sterile condition and without heating.

5. A pure concentrate for use in a more dilute form is often desirable. This can be accomplished by the use of my present invention. The juice is put into a suitable vacuum pan and concentrated at a low temperature. The chloroform is entirely removed and the concentrated juice keeps indefinitely when transferred to sterile containers under sterile conditions. This gives a very superior product.

6. In the regular preparation of the fruit juice, the chloroform is separated from the clear juice by vacuum distillation. The juice is then transferred to containers of a proper degree of sterilization and is then ready for use. Not all conditions are right for using the temperature of vacuum distillation for bottling. I may vary the temperature and vacuum to those found desirable and appropriate under the particular conditions of operation. If desired, I may pasteurize the juice. In any event, the temperature of the juice and the temperature for pasteurizing can be lowered below those now customarily employed and thereby insure the production of a better fruit product.

It is desirable to have methods of handling fruits so that during the short period of harvest the preserver does not have to make his finished product. Further, there are many products that can be made from one fruit. For example, orange juice, orange syrups, jelly, jams, butters, marmalades, conserves (pure or mixed) etc., may be made from oranges. At the proper season for buying oranges for factory use, it is frequently not known just how much of each of these products it is desirable to manufacture. The result is that inferior goods are often put up from pulp months later, or that the demand is not satisfied for particular products. It is often impossible to turn all of the fruit as received into final marketable products, in which case it is customary to prepare the fruit, put it through the commercial stage known as pulping, heat it and store it as pulp. If juice is subsequently desired, it is very inferior for the heating of the pulp has been too high for juice production. If other fruit products using pulp are wanted, they are of inferior flavor for the pulp has already been heated and the second heating lowers the quality. A certain amount of heat extracts what is known as pectin, but further heatings decompose the pectin and make the production of the fruit products more expensive requiring more raw product.

In accordance with my present invention, I can, by the aid of chloroform or other appropriate preservative, preserve the prepared fruit, either whole (dependent on the fruit, size, ripeness, etc.), as the pulp, or crushed. By following my present invention the fruit is not injured by heating and at a subsequent period the desired fruit products can be readily and conveniently prepared and will be of superior quality.

In the heretofore customary processes, the most important or valuable part of the fruit is often handled alone, while the remainder spoils. In accordance with my present invention, I am able to increase the production and quality and make more products and save parts of the fruit that are now lost.

The removal of the volatile preservative, such as chloroform, from the fruit product may, and usually is, conducted so as to recover the preservative as completely as practicable. There is, of course, some loss of the preservative by evaporation into the atmosphere, particularly during the pouring and other handling in the open of fruit products while preserved in accordance with the principles of the invention. However, by careful manipulation a large percentage of the volatile preservative can be recovered and used again. In certain cases this reuse of the volatile preservative is an important part of the invention. The volatile preservative when distilled from the fruit juice often carries over with it certain of the delicate flavors of the fruit. By using it again on a new batch of fruit or fruit juice, these flavoring materials originally removed by the distillation may be thus restored to the second batch.

It is to be understood that the present invention gives a wide latitude in methods of handling fruit products. Thus, if it is not necessary to pack the final products at once, a long time standing with the preservative at ordinary temperatures will effect sterilization. If, on the other hand, it is necessary, for commercial reasons, to pack the final products immediately, then the combined action of moderate heat and the chemical preservative effects sterilization in a very short time. It is characteristic of the invention that a non-injurious degree of heat will in every case be sufficient when used in conjunction with the contemplated chemical preservatives. When effecting a quick sterilization of this latter type the heating may take place in a closed system under pressure to avoid loss of volatile preservative during the sterilization stage. Such a procedure is merely an alternative method of operation and not usually necessary. In certain cases, it will be found desirable or advantageous to agitate the fruit product, by suitable means, during the sterilization or during the subsequent removal of the volatile preservative.

I claim:

1. The method of protecting fruit products against fermentation, which comprises treating the fruit product with a readily volatile preservative of only relatively slight solubility in the product, and confining the so-treated product in a hermetically sealed receptacle in which the space not occupied by the product itself is substantially filled with the vapor of said preservative.

2. The method of protecting fruit products against fermentation, which comprises confining the fruit product in a hermetically sealed receptacle containing a sufficient amount of a readily volatile preservative to inhibit fermentation of the product and to substantially fill the space in the receptacle not occupied by the product with the vapor of said preservative.

3. The method of inhibiting to a desired extent fermentation of a fruit product, which comprises associating with said product a relatively small quantity of a readily volatile preservative only slightly soluble in the product, and confining the product with the preservative associated therewith in a hermetically sealed receptacle under such conditions that the space not occupied by the product itself is substantially filled with the vapor of said preservative.

4. The method of protecting an intermediate fruit product against fermentation, which comprises treating the fruit product with a readily volatile preservative of only relatively slight solubility in the product, confining the so-treated product in a hermetically sealed receptacle under such conditions that the space not occupied by the product itself is substantially filled with the vapor of said preservative, subsequently opening said receptacle and removing the preservative from the intermediate fruit product by volatilization, and utilizing the intermediate fruit product thus freed of the preservative in the manufacture of a final fruit product.

5. The method of protecting fruit products against fermentation, which comprises treating the fruit product with a relatively small amount of chloroform, and confining the so-treated product in a hermetically sealed receptacle in which the space not occupied by the product itself is substantially filled with chloroform vapor.

6. The method of protecting fruit products against fermentation, which comprises confining the fruit product in a hermetically sealed receptable containing a sufficient amount of chloroform to inhibit fermentation of the product and to substantially fill the space in the receptacle not occupied by the product with chloroform vapor.

7. The improvement in the method of manufacturing a marketable fruit product from an intermediate fruit product, which comprises protecting the intermediate fruit product against fermentation by treating the product with a relatively small quantity of chloroform, confining the so-treated product in a hermetically sealed receptacle under conditions such that the space not occupied by the intermediate product itself is substantially filled with chloroform vapor, subsequently opening said receptacle and removing the chloroform from the intermediate product by volatilization, and utilizing the intermediate product thus freed of the chloroform in the manufacture of the marketable fruit product.

8. The improvement in the manufacture of a marketable fruit product from an intermediate fruit product, which comprises confining the intermediate fruit product in a hermetically sealed receptacle containing a sufficient amount of chloroform to inhibit fermentation of the intermediate product and to substantially fill the space in the receptacle not occupied by the intermediate product with chloroform vapor, subsequently opening said receptacle and removing the chloroform from said intermediate product by volatilization, and utilizing the intermediate product thus freed of the chloroform in the manufacture of the marketable fruit product.

9. The improvement in the method of manufacturing a marketable fruit product from an intermediate fruit product, which comprises protecting the intermediate fruit product against fermentation by treating the product with a readily volatile preservative of only relatively slight solubility in the product, confining the so-treated product in a hermetically sealed receptacle under conditions such that the space not occupied by the intermediate product itself is substantially filled with the vapor of said preservative, subsequently opening said receptacle and removing the preservative form the intermediate product by volatilization, and utilizing the intermediate product thus freed of the preservative in the manufacture of the marketable fruit product.

10. The improvement in the manufacture of a marketable fruit product from an intermediate fruit product, which comprises confining the intermediate fruit product in a hermetically sealed receptacle containing a sufficient amount of a readily volatile preservative of only slight solubility in the product to inhibit fermentation of the intermediate product and to substantially fill the space in the receptacle not occupied by the intermediate product with the vapor of said preservative, subsequently opening said receptacle and removing the preservative from said intermediate product by volatilization, and utilizing the intermediate product thus freed of the preservative in the manufacture of the marketable fruit product.

In testimony whereof I affix my signature.

RAYMOND F. BACON.